United States Patent [19]

Watanabe et al.

[11] Patent Number: 4,764,959
[45] Date of Patent: Aug. 16, 1988

[54] SINGLE-CHIP MICROCOMPUTER WITH ENCRYPTABLE FUNCTION ON PROGRAM MEMORY

[75] Inventors: Masafumi Watanabe, Kawasaki; Toshitune Ozaki, Ayase; Jiro Hirahara, Yokohama, all of Japan

[73] Assignee: Kabushiki Kaisha Toshiba, Kawasaki, Japan

[21] Appl. No.: 646,114

[22] Filed: Aug. 31, 1984

[30] Foreign Application Priority Data

Oct. 14, 1983 [JP] Japan ................................ 58-191915
Oct. 14, 1983 [JP] Japan ................................ 58-191916

[51] Int. Cl.⁴ .......................................... H04L 9/04
[52] U.S. Cl. .......................................... 380/4; 380/23; 380/25
[58] Field of Search ........................ 178/22.08, 22.09; 380/4, 23, 25

[56] References Cited

U.S. PATENT DOCUMENTS

| | | | |
|---|---|---|---|
| 4,168,396 | 9/1979 | Best | 178/22.09 |
| 4,278,837 | 7/1981 | Best | 178/22.09 |
| 4,319,079 | 3/1982 | Best | 178/22.09 |
| 4,433,207 | 2/1984 | Best | 178/22.09 |
| 4,465,901 | 8/1984 | Best | 178/22.09 |
| 4,471,163 | 9/1984 | Donald et al. | 380/4 |
| 4,471,216 | 9/1984 | Herve | 380/23 |
| 4,525,599 | 6/1985 | Curran et al. | 178/22.08 |
| 4,543,646 | 9/1985 | Ambrosius, III et al. | 178/22.09 |
| 4,555,591 | 11/1985 | Nash | 178/22.09 |
| 4,598,170 | 7/1986 | Piosewka et al. | 380/4 |
| 4,633,388 | 12/1986 | Chiv | 380/4 |
| 4,634,807 | 1/1987 | Chorley et al. | 380/4 |

OTHER PUBLICATIONS

Hindin, LSI-Based Data Encryption Discourages the Data Thief, Electronics, vol. 52, No. 13, published Jun. 21, 1979, pp. 107-120.
Intel Microcontroller Handbook 1983.

*Primary Examiner*—Salvatore Cangialosi
*Attorney, Agent, or Firm*—Finnegan, Henderson, Farabow, Garrett and Dunner

[57] ABSTRACT

A single-chip microcomputer with an encryptable function on program memory encrypts the contents of the memory for protection of secrecy when the programs stored in read only memory (ROM) are read to the outside. An encrypting code generator is provided to execute the encrypting and the encrypting code is stored in an instruction decoder, which decodes the encrypting code and sends it to the arithmetic and logic unit (ALU). The ALU encrypts the data from the ROM based on the encrypting code from the decoder, and outputs the result to the outside on an input/output port.

10 Claims, 8 Drawing Sheets

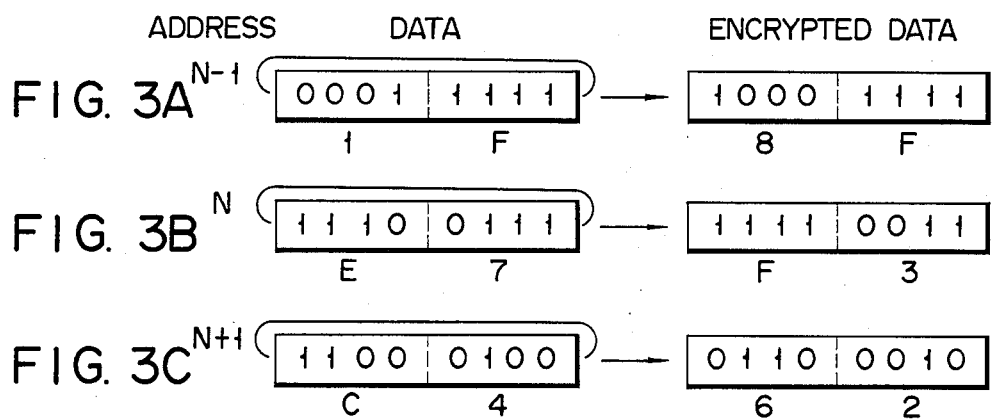
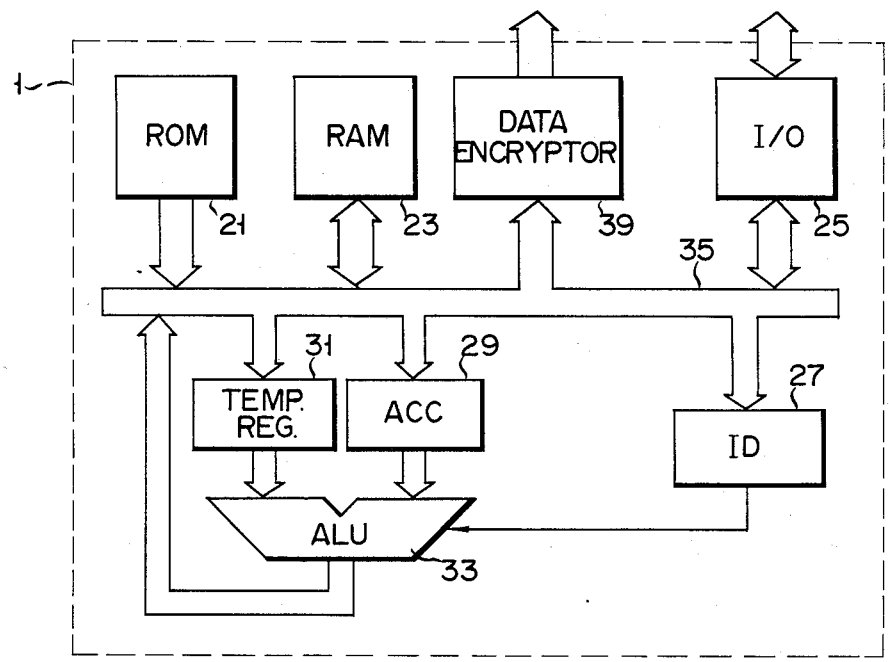

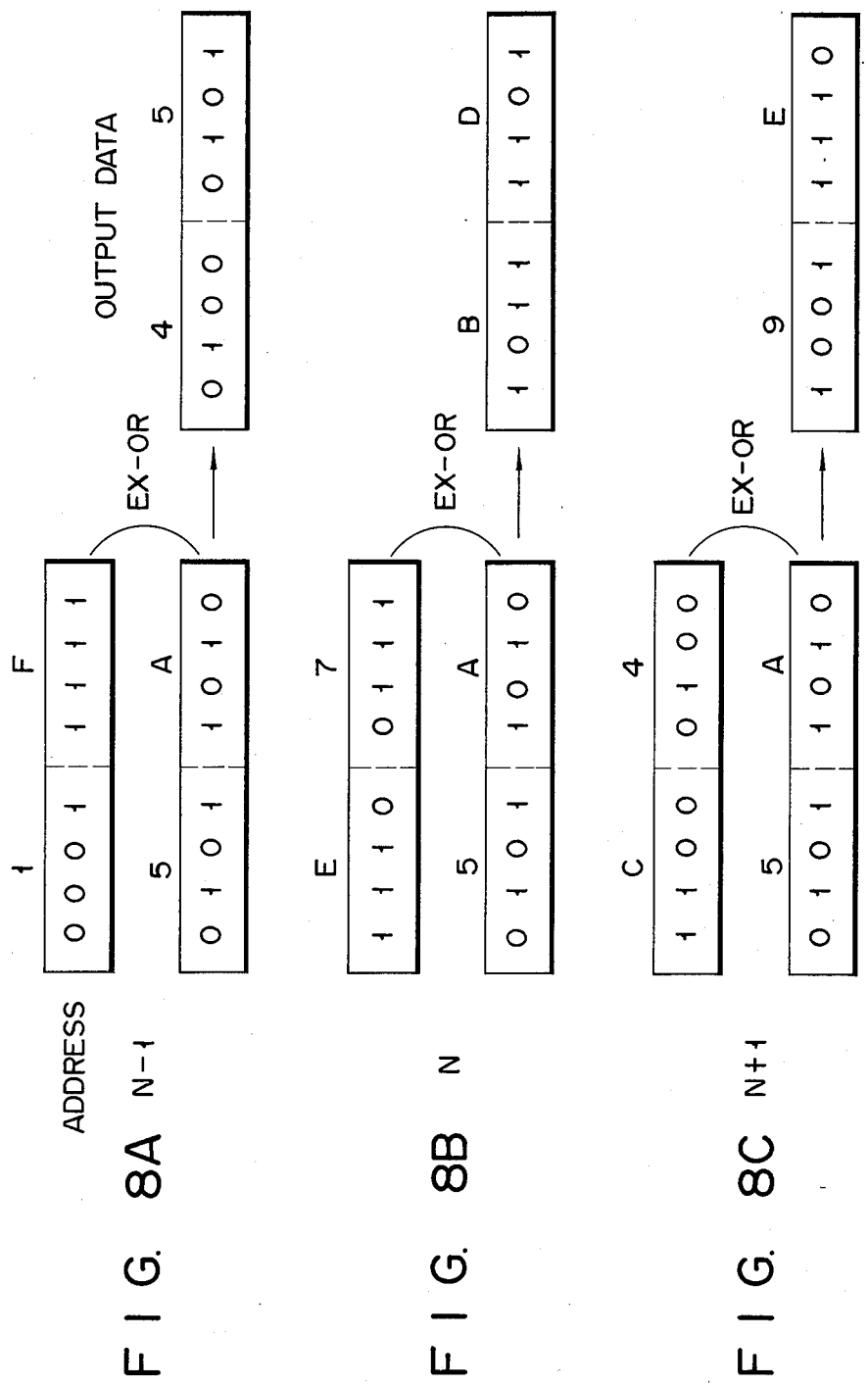

SINGLE-CHIP MICROCOMPUTER WITH ENCRYPTABLE FUNCTION ON PROGRAM MEMORY

BACKGROUND OF THE INVENTION

This invention relates to a single-chip microcomputer which can read out the encrypted contents of a program memory.

In recent years, program memory, data memory and input/output interface along with central processing unit have been integrated onto one chip. This chip, then, has come to be used as a single-chip microcomputer, or a computer on a chip.

FIG. 1 is a block diagram showing an example of such a microcomputer 1. This microcomputer 1 has a mask ROM 3, which stores the programs, a RAM 5, which is used such as a temporary data storage and a work area and so on, an input/output port 7, an instruction decoder 9, which decodes the instructions of the program stored in the ROM 3, an accumulator 11, which is used to store intermediate calculation results and to perform arithmetic logic calculations, a temporary register 13 for temporarily storing the data on which an arithmetic logic unit operates, and an arithmetic logic unit 15 (ALU), which operates on the data stored in the accumulator 11 and temporary register 13. Each of these elements are connected through a bus 17. The instructions read from the ROM 3 are decoded by an instruction decoder 9 and, based on these control signals, the processing data is read from the RAM 5, or the input port, and set in the temporary register 13 and accumulator 11. The processed result by the ALU 15 is stored in the RAM 5, or is transmitted to an output port 7 through the bus 17.

In order to verify the contents of the program memory, etc., this kind of microcomputer often is arranged so that the contents can be read out from the outside. An example of this kind of microcomputer is an 8-bit, single-chip microcomputer 8048 designed by Intel Corp. of the U.S.A. If the address is supplied to the X1 and X2 terminals (not shown) the address terminal and clock signals are supplied to and the timing signals are supplied to the EA and $\overline{\text{RESET}}$ terminals with specified timings, the contents at a designated address of the ROM will be output on the output terminals.

In this kind of device, however, the program contents of the ROM 3 can easily be read out by a third party, resulting in unexpected damage to the contents of this device, or the original maker of the application program on this device. In other words, a third party can read out the contents of the ROM and copy it.

There are microcomputers in which it is impossible to read out the contents of the ROM from the outside but these have the disadvantage that the program contents can not be verified in shipping and delivery inspections.

Another method of preventing copying by a third party is to use a particular and exclusive code as the instruction code but this method results in reduced uses, difficulty in utilization of standard support softwares and difficulty in modifying the already developed programs.

SUMMARY OF THE INVENTION

An object of the present invention is to provide a single-chip microcomputer with program contents that can be read out but cannot be copied by a third party.

In order to achieve the above and other objects, there is provided according to the present invention a single-chip microcomputer with an encryptable program memory, comprising:

a program memory which stores a program;

a central processing unit which executes the program read out from said program memory;

an input/output port which inputs and outputs to the outside data which is operated on by said central processing unit; and means for encrypting the contents of said program memory when the contents are output to the outside.

BRIEF DESCRIPTION OF THE DRAWINGS

Other objects and features of the present invention will be apparent from the following description which is given in conjunction with the accompanying drawings in which:

FIGS. 3A, 3B and 3D show an example of the data encryption in the embodiment of FIG. 2;

FIG. 4 is a block diagram of another embodiment of the invention;

FIGS. 8A through 8C show an example of data encryption in the embodiment of FIG. 7;

DETAILED DESCRIPTION OF THE PREFERRED EMBODIMENTS

Figure 1:
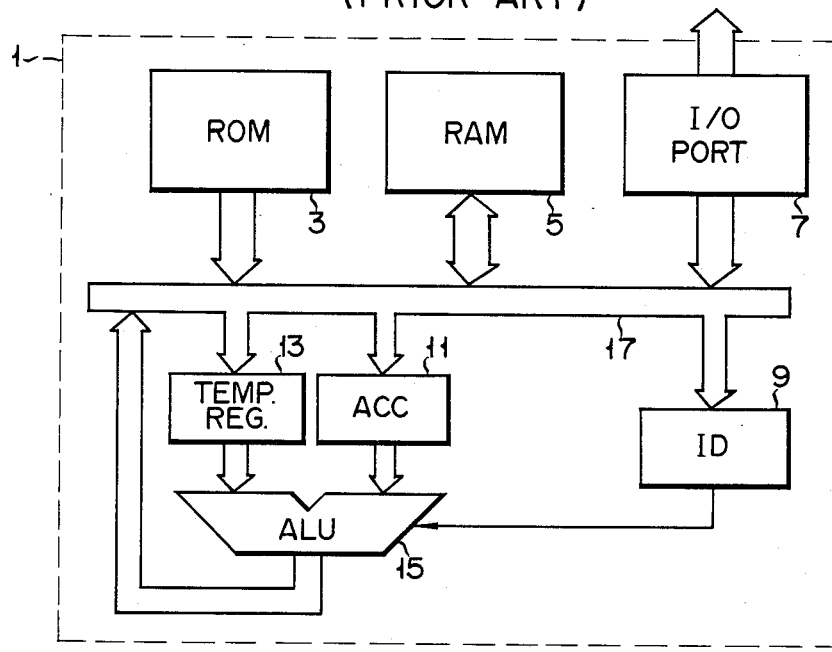
FIG. 1 is a schematic of a prior art single-chip microcomputer.

Now an embodiment of the present invention will be described referring to FIG. 2. In this embodiment, an arithmetic and logic unit (ALU) provided on the single-chip microcomputer is used to encrypt the data. The single-chip microcomputer 19 of this invention with encryptable function of program memory includes a mask ROM 21, which stores the programs, a RAM 23, which is used such as a temporary data storage and a work area, an input/output port 25, an instruction decoder 27, which decodes the instructions of the program stored in the ROM 21, an accumulator 29, which is used to store intermediate computation results and to perform arithmetic logic operations, a temporary register 31 for temporarily storing the data on which an arithmetic and logic unit operates, and an arithmetic and logic unit(ALU) 33, which operates on the data stored in the accumulator 29 and temporary register 31. Each of these elements are connected by a bus 35. The instructions read out from the ROM 21 are decoded by an instruction decoder 27 and, based on these control signals, the processing data is read out from the RAM 23 and I/O port, and set in the temporary register 31 and accumulator 29. The processed result by the ALU 33 is stored in the RAM 23, or is output to the I/O port 25 through the bus 35. The code generator 37, which is the crux of this invention, is connected to the instruction decoder 27. (This kind of a code generator may be a ROM structure.)

When a signal specifying the read out of the contents of ROM 21 is supplied from the outside, code generator 37 sends a preset encrypting code to the instruction decoder 27. Then, address, which corresponds to desired address of the ROM 21, is input from the outside, and data corresonding to the address is read into the accumulator 29, where the data is encrypted through a normal ALU function specified by the encryption code.

This data encryption or conversion instruction may be, for example, a shift instruction, a common instruction of microcomputers, which shifts the bit position of the data, a rotate instruction, which rotatingly shifts the bit position, or a complement instruction, which inverts the data in each bit position. When a shift or rotate instruction is executed, any shift direction or number of shift bit may be selected. With the complement instruction, the position of the bit to be inverted may be specified.

In this way, the data read out from the ROM 21 is encrypted and output on the I/O port 25. The result of which is that this output data is different from the memory contents of the ROM 21. So, the copying by a third party is impossible and the data encryption function is unknown for a third party.

For example, as shown in FIGS. 3A to 3C, 8-bit data which are 1F, E7 and C4 in hexadecimal are stored at addresses (N−1), (N) and (N+1), respectively. When data is output to the outside, if the data is rotated to the right by one bit, the values at addresses (N−1), (N) and (N+1) are converted to 8F, F3 and 62. Accordingly, the output data is entirely unrecognizable as the contents of the ROM 21.

Accordingly, it is possible for the program stored in ROM 21 to use the particular instruction code of microcomputer 19 without any modification and, therefore, it is possible to use the standard support softwares and to easily improve the already developed application programs.

In other words, when the contents of the ROM 21 are requested from the outside, the data is encrypted based on the output of the code generator 37. Consequently, a third party, who of course is not familiar with the method of data encryption, will not be able to decode the contents and, accordingly, the actual program contents remain hidden. On the other hand, a user who does know the method of data decryption will be able to verify the read-out program and to reconstruct the program as it is before encryption so that the analysis of the read-out program can easily be performed.

One of the advantages of this invention is that the contents of ROM 21 and the encryption code of the code generator 37 can be set in the same manufacturing process so there is no increase in the number of processes for encrypting and it is possible to set the encryption code for individual data corresponding to the contents of ROM 21.

This invention is not limited to the above embodiment. In the above embodiment, the particular instruction code (hardware) of microcomputer 19 is used to encrypt the data but, it is also possible for the encryption to be effected by hardware that is specifically for that purpose. This kind of special hardware may be provided in the input/output port, for example, when the data is read out of a special I/O port. This hardware would then operate only when the contents of the program memory are output.

FIG. 4 shows one example of this kind of microcomputer in which the data encryption is performed by a code encryptor provided in the output port.

Figure 5:
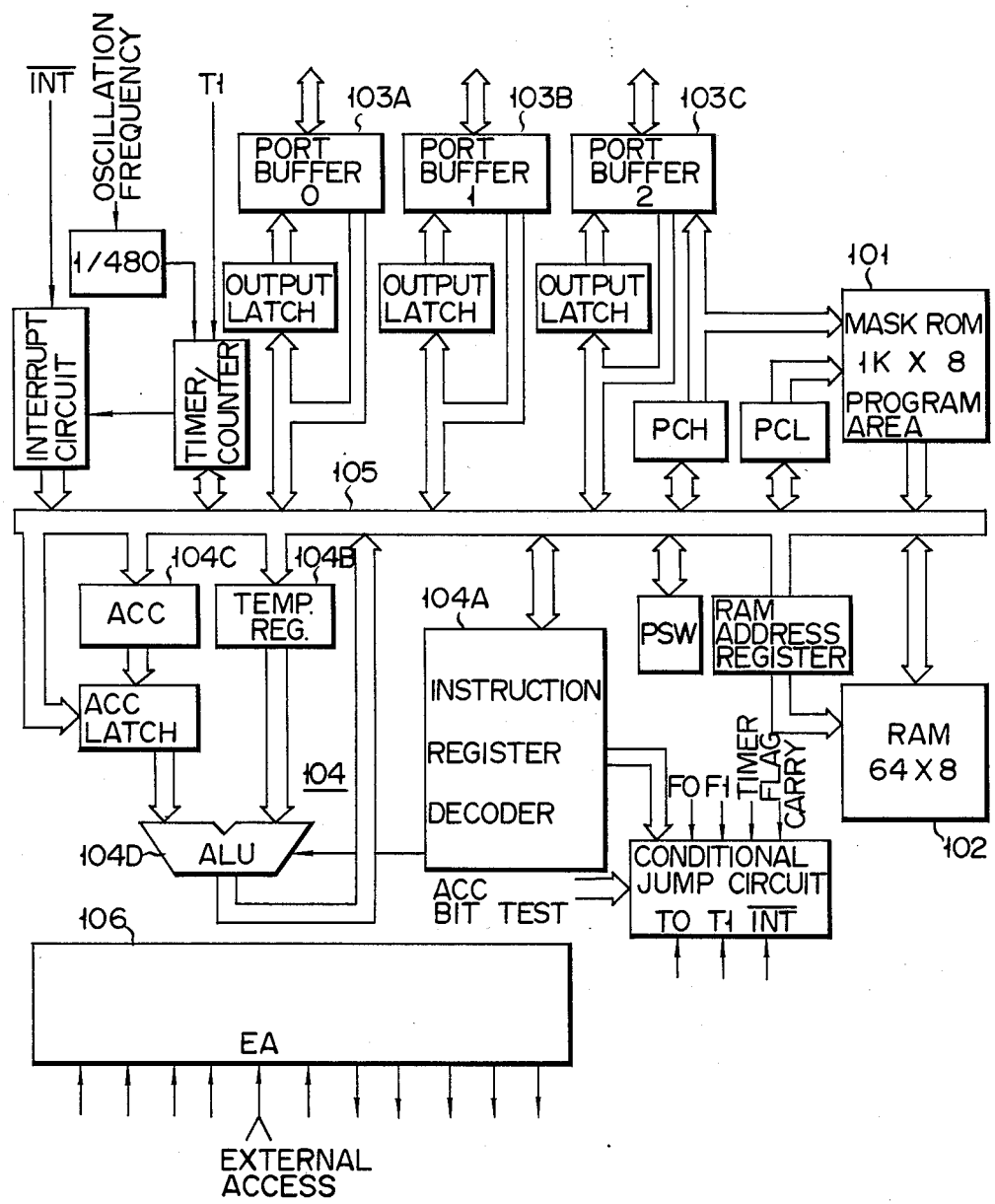
FIG. 5 is a block diagram showing 8048 single-chip microcomputer of Intel Corp. U.S.A.
Figure 6:
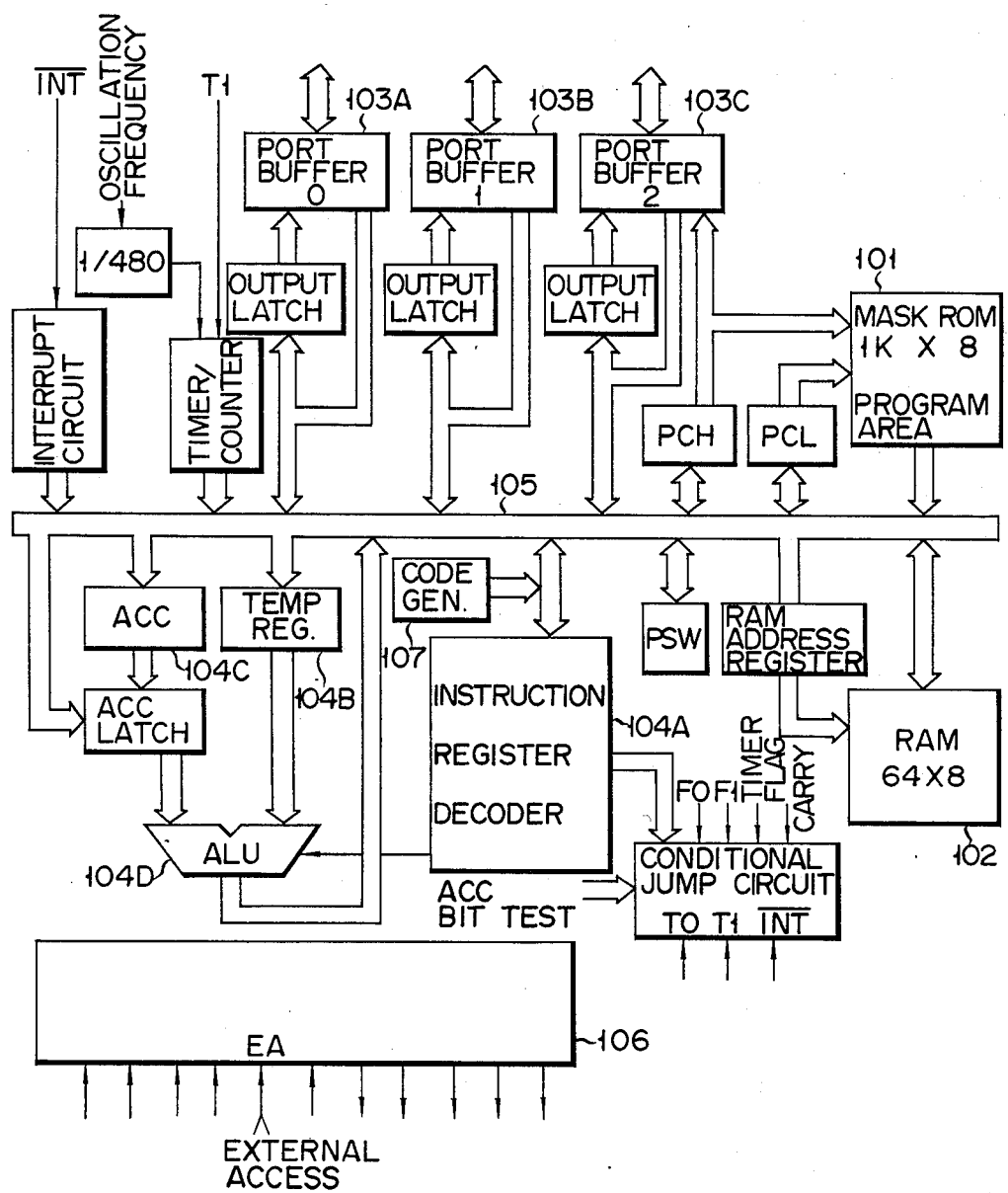
FIG. 6 shows an example of this invention as applied to Intel's 8048 microcomputer.

FIG. 5 is a block diagram of the widely used 8-bit Intel original microcomputer 8048. This microcomputer 104 integrates a 1K-byte mask ROM 101, a 64-byte RAM 102 and three groups of 8-bit I/O ports 103A, 103B and 103C together with a microprocessing unit 104, which has an instruction decoder 104A, temporary register 104B, accumulator 104C and an arithmetic logic unit, onto one chip. All the elements are interconnected by an internal bus 105.

When the contents of the mask ROM 101, which is used as the program memory, are read out, +12V is applied to the EA external access terminal connected to the control and timing circuit 106. By applying an address to the lower 2-bit of the I/O port 103C and data bus DB0 through DB7, the contents of ROM 101 which corresponds to this address are output through data bus DB0 through DB7.

When this invention is applied to this kind of microcomputer, a code generator 107 may be provided between bus 105 and instruction decoder 104, for example. When the external signals for reading out the contents of ROM 101 is received, the indicated data is encrypted through the ALU function specified by the code from the code generator 107 and output on data bus DB0 through DB7. Namely, a code, which is predetermined by the instruction code of the 8048, is output by code generator 107, and applied to instruction decoder 104A for encryption. Accordingly, the encryption of the data is performed by using the particular hardware of the 8048 in the same way that a program is performed. The improvement to the hardware is only in relation to code generator 107 and is extremely easy.

Figure 2:
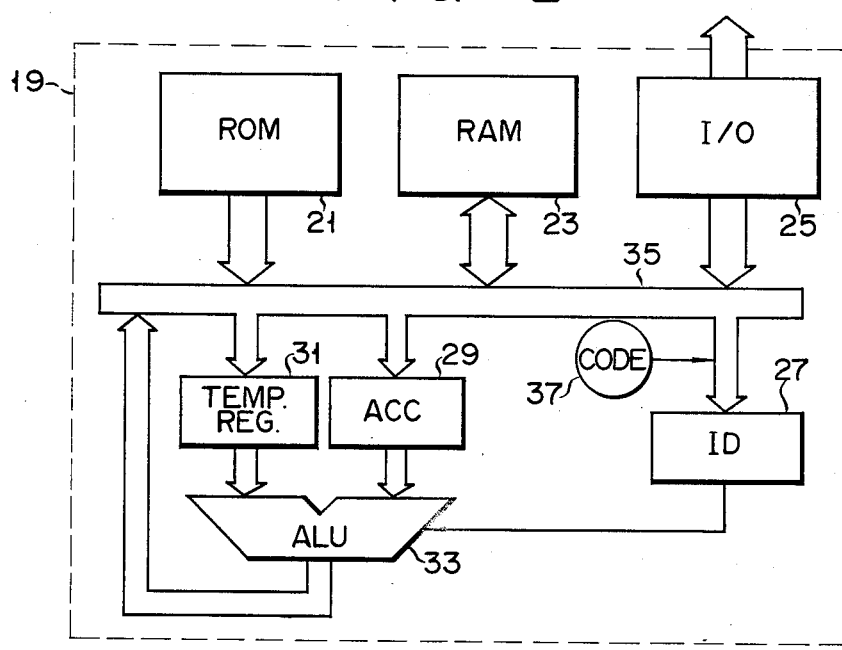
FIG. 2 is a block diagram showing an embodiment of the present invention.
Figure 7:
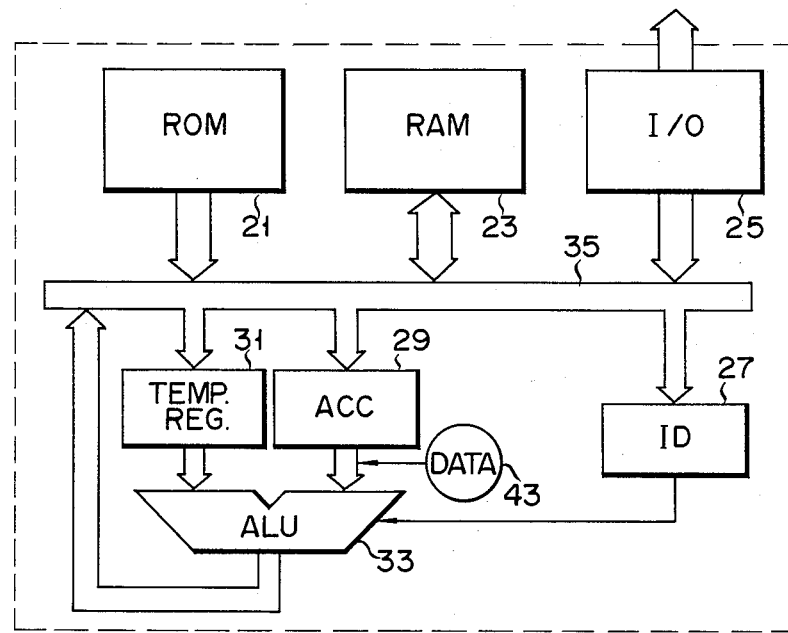
FIG. 7 is a block diagram showing another embodiment of this invention.

FIG. 7 is a schematic of another embodiment of this invention in which the same numerals are used for the same parts in FIG. 2.

In this embodiment, the data generator 43 is connected between the accumulator 29 and the ALU 33. In this case, the encoding data, which is preset by the data generator 43 is applied to the ALU 33 and the ROM data encryption is executed using this data. The encryption includes logical operations such as AND, OR and exclusive OR operations and arithmetic operation such as addition and subtraction. Such operations are executed by applying the fixed instruction code, which corresponds to the desired arithmetic or logical operation, to the instruction decoder 27 of microcomputer 19. This is executed by the particular hardware of the microcomputer in the same way as the regular program processing. Then, after processing has been executed on the data stored in the accumulator 29, the data is output through the I/O port 25.

For example, as is shown in FIGS. 8A through 8C, 8-bit data 1F, E7 and C4 in hexadecimal notation are stored, respectively at the addresses (N−1), (N) and (N+1) of ROM 21. Also, if these data 1F, E7 and C4 are exclusive ORed with the encrypting data 5A set in the data generator 43 at the ALU 33, the resulting data at the respective addresses will be 45, BD and 9E. Accordingly, it is impossible to recognize the contents of the ROM 21 from the output data.

Figure 9:
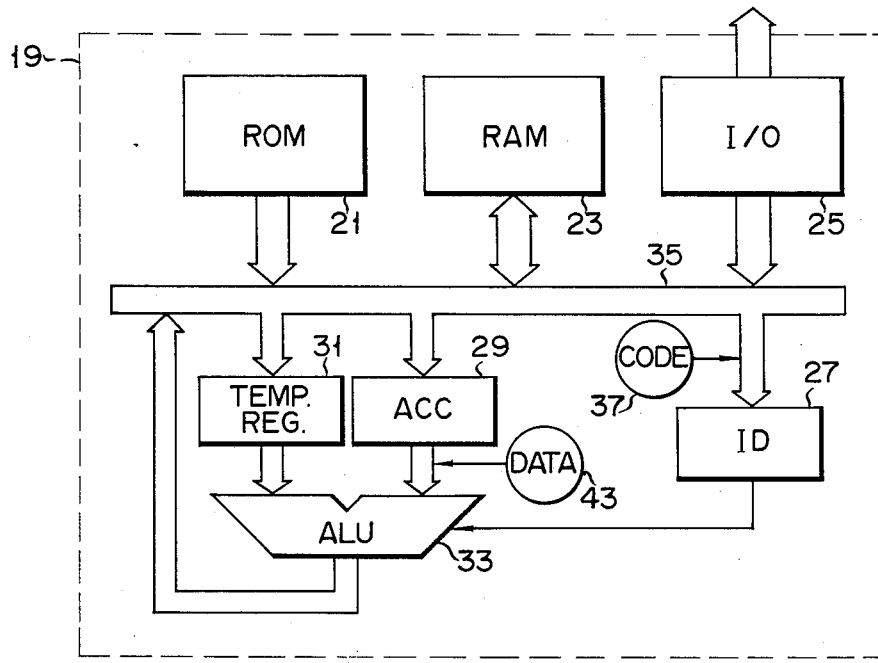
FIG. 9 is a block diagram showing another embodiment of this invention.

FIG. 9 shows another embodiment of this invention in which the code generator 37 shown in FIG. 2 is added to the embodiment shown in FIG. 7. The generated code from the code generator 37 is supplied to the instruction decoder 27 and the corresponding instruction is executed. ROM data encryption is performed using the encrypting data, and the result is output. In this way, it is possible to make any logical processing using the particular hardware and instructions of the microcomputer 19 in response to the encrypting code. Accordingly, when the contents of the ROM 21 are read out to the outside, it is possible to execute different logical operations for each constant ROM area, for example, making it that much more difficult for a third party to decode the contents.

Of course, in this case as well, it is possible to set the contents of the ROM 21, data generator 43 and code generator 37 in the same manufacturing process so it is possible to set encrypting code for each of the contents of ROM 21.

Figure 10:
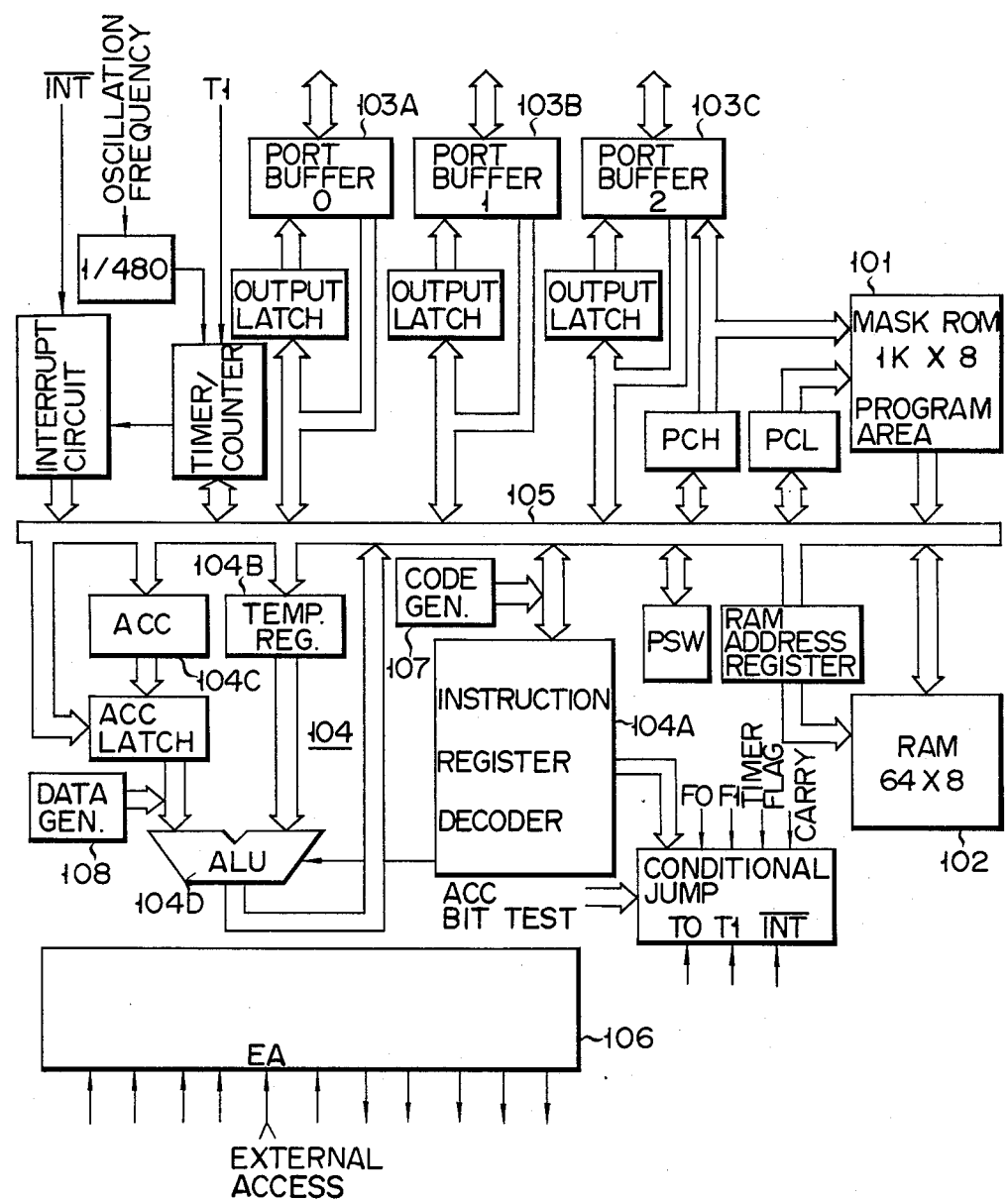
FIG. 10 is a block diagram showing the embodiment of FIG. 9 as applied to the 8048 microcomputer.

FIG. 10 shows the embodiment of FIG. 9 as applied to the 8048 microcomputer. Namely, code generator 107 is provided between the bus 105 and the instruction decoder 104A and a data generator 108 is provided at the input of ALU 104D. The signals are applied to the external access terminal EA to read the contents of the mask ROM 101. The data read out from the ROM 101 is processed with the encrypting data from the data generator 108 and by the ALU function corresponding to the instruction code given by the code generator 107. This result is output on the data bus DB0 through DB7. In other words, the code, from code generator 107, which is determined by the instruction set of the 8048, is output and supplied to the instruction decoder 104A for execution of a logic function. Accordingly, the encryption can be executed using the particular hardware of the 8048 in the same way as for a regular program. The only addition to the hardware that is required is the code generator 107 and data generator 108, which are simple to add.

In the embodiments of FIGS. 7 and 9, the data generator 43 may one that stores fixed data so the contents of data generator are set in the same manufacturing process as the contents of ROM 21. It is possible to use part of the ROM 21 as the data generator 43. It is also possible for the generator 43 to have the same values for all the data of ROM 21 or, to use different data for each constant address area of the ROM 21. When random data corresponding to all the contents of the ROM 21 are stored in the data generator 43 and a request of ROM readout is received, the encryption is performed on the random data of the constant bit read out from the data generator 37 for each constant bit in the ROM 21, and the result is output.

Also, in the above embodiment, the instruction code and inherent hardware of the microcomputer 19 may be used to execute the encryption but special hardware may also be provided.

Figure 11:
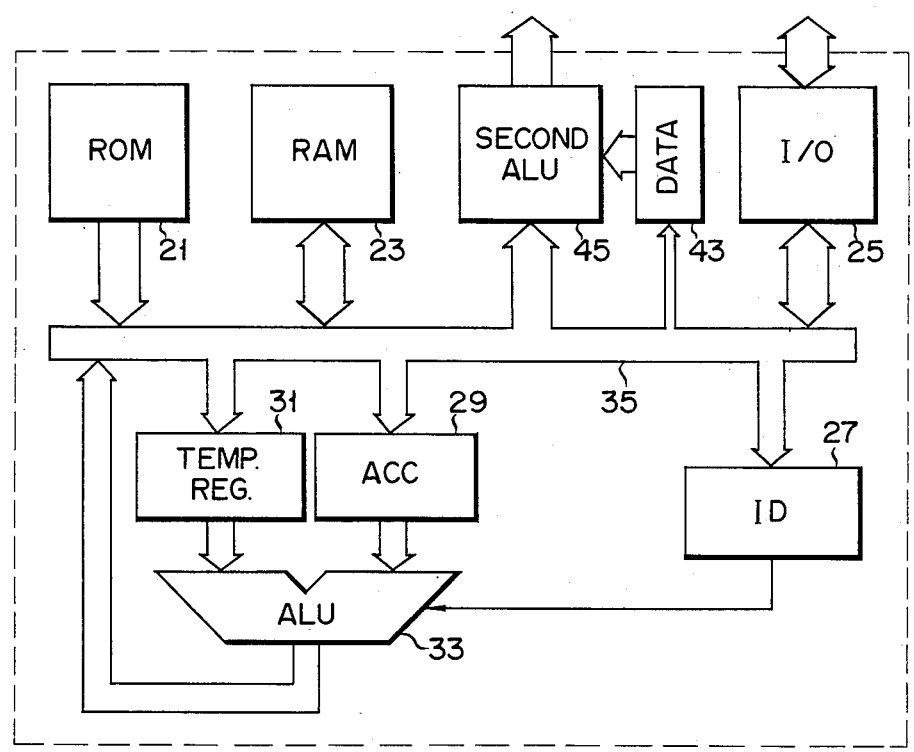
FIG. 11 is a block diagram showing another embodiment of this invention.

FIG. 11 is a block diagram of this kind of microcomputer. A signal having a specified logic level is applied to a terminal (not shown) to output the contents of ROM 21 to the outside. The data read out from the ROM 21 is supplied to a second ALU 45 via a bus 35. Data is sent from data generator 43 to the second ALU 45 and operations, such as addition, subtraction and logic operations, are executed on it. The execution result is then output to the outside. If the encrypting code of the code generator 107 or the encrypting data of the data generator 108 is set simultaneously with the mask ROM 101, which stores the predetermined program, it is not necessary to carry out a special process for the manufacture of the encrypting code or data. Also, it is possible to simply set different encrypting code or data for all the contents of the mask ROM 101.

What is claimed is:

1. A single-chip microcomputer with an encryptable function, comprising:
    a read-only memory for storing a program;
    encryption-designating code providing means, manufactured on the single chip by the same process as that for storing the program of said read-only memory, for providing a code designating a type of encryption for said program stored in said read-only memory responsive to a request for access to said program from a source external to said microcomputer;
    a central processing unit including means for reading the program from said read-only memory, means for encrypting said program in accordance with said code provided by said encryption-designating code providing means in response to said request for access to said program from said source external to said microcomputer, in order to verify whether or not the program stored in said read-only memory is correctly written therein; and
    an input/output port for receiving said encrypted program and outputting said encrypted program externally of said microcomputer.

2. A single-chip microcomputer according to claim 1, wherein said encryption-designating code providing means provides a code designating a predetermined rotation of said program read out from said read-only memory.

3. A single-chip microcomputer according to claim 1, wherein said encryption-designating code providing means provides a code designating inversion of a predetermined bit of said program read out from said read-only memory.

4. A single-chip microcomputer according to claim 1, wherein said encryption-designating code providing means provides a code designating a predetermined shift of the program read out from said read-only memory by a predetermined value.

5. A single-chip microcomputer with an encryptable function, comprising:
    a read-only memory for storing a bit representation of a program in a plurality of fixed areas;
    encrypting data providing means, manufactured on the single-chip in the same process as that for storing said program in said read-only memory, for providing encryption data;
    a central processing unit for executing said program read out from said read-only memory and, responsive to a request for access to said program from a source external to the microcomputer, for executing a predetermined logic operation on said encrypting data from said encrypting data providing means and said program output from said read-only memory, in order to verify whether or not the program stored in said read-only memory is correctly written therein; and
    an output port coupled to said central processing unit, for outputting the result of said logic operation in response to the request for access to said program from said source external to the microcomputer.

6. A single-chip microcomputer according to claim 5, wherein said encrypting data outputted from said encrypting data providing means have different values for every fixed area of said read-only memory.

7. A single-chip microcomputer according to claim 5, wherein said encrypting data from said encrypting data providing means corresponds to every bit in said read-only memory.

8. A single-chip microcomputer with an encryptable function, comprising:
a read-only memory for storing a program;
an encrypting data generator for generating encrypting data in repsonse to a request for access to said program from a source external to the microcomputer;
an encrypting-type designating code generator for generating a code designating encryption of said program read out from said read-only memory, said encrpting data generating means and said encrypting-type designation code generator being formed in the single chip in the same process as that for setting said program in said read-only memory; and
arithmetic and logic unit means for reading said program from said read-only memory, and responsive to said request for access to said program from said source external to the microcomputer for encrypting said program by logically combining said program from said read-only memory and said encrypting data, in accordance with said encrypting-type designation code, in order to verify whether or not the program stored in said read-only memory is correctly written therein.

9. A single-chip microcomputer according to claim 8, wherein said read-only memory includes a plurality of fixed areas, and wherein said encrypting data are different for each of said fixed areas of said read-only memory.

10. A single-chip microcomputer according to claim 8, wherein said read-only memory stores a bit representation of said program, and wherein said encrypting data includes data corresponding to every bit of said program in said read-only memory.

* * * * *